(12) United States Patent
Madoglio et al.

(10) Patent No.: US 9,054,925 B1
(45) Date of Patent: Jun. 9, 2015

(54) PARALLEL DIGITAL-TO-TIME CONVERTER ARCHITECTURE

(71) Applicant: Intel Corporation, Santa Clara, CA (US)

(72) Inventors: Paolo Madoglio, Beaverton, OR (US); Stefano Pellerano, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/096,464

(22) Filed: Dec. 4, 2013

(51) Int. Cl.
*H04B 1/38* (2006.01)
*H04L 5/16* (2006.01)
*H04L 27/20* (2006.01)
*H03M 1/82* (2006.01)
*H03M 1/74* (2006.01)
*H03M 1/68* (2006.01)
*H04L 27/22* (2006.01)

(52) U.S. Cl.
CPC ............... *H04L 27/20* (2013.01); *H03M 1/822* (2013.01); *H03M 1/74* (2013.01); *H03M 1/68* (2013.01); *H04L 27/22* (2013.01)

(58) Field of Classification Search
CPC ............. H03L 1/00; H04L 27/22; H03M 1/68
USPC .......................................................... 375/219
See application file for complete search history.

(56) References Cited

U.S. PATENT DOCUMENTS

| 6,066,968 | A  | * | 5/2000 | Yang | 327/156 |
| 2010/0183066 | A1 | * | 7/2010 | Chen et al. | 375/239 |
| 2011/0156781 | A1 | * | 6/2011 | Ecklund et al. | 327/159 |
| 2012/0288044 | A1 | * | 11/2012 | Roberts et al. | 375/350 |
| 2013/0223564 | A1 | * | 8/2013 | Mayer et al. | 375/296 |
| 2014/0002288 | A1 | * | 1/2014 | Scholz | 341/144 |
| 2014/0321577 | A1 | * | 10/2014 | Kuttner | 375/302 |

* cited by examiner

*Primary Examiner* — Erin File
(74) *Attorney, Agent, or Firm* — Schwegman Lundberg & Woessner, P.A.

(57) ABSTRACT

This document discusses, among other things, digital-to-time converters (DTCs) and more particularly to parallel implementations of DTCs. In an example, an apparatus can include a first digital-to-time converter (DTC) configured to receive reference frequency information and first phase information of a polar transmitter and to provide a first portion of phase modulation information, a second DTC configured to receive second phase information of the polar transmitter and to provide a second portion of phase modulation information, and a combiner configured to receive the first portion and the second portion and to provide a phase modulated signal.

21 Claims, 7 Drawing Sheets

US 9,054,925 B1

PARALLEL DIGITAL-TO-TIME CONVERTER ARCHITECTURE

TECHNICAL FIELD

This document discusses, among other things, wireless communications and, more particularly, parallel digital-to-time converter (DTC) architecture for wideband or high-speed communication applications.

BACKGROUND

Digital-to-time converters (DTCs) are being considered for use in cellular communication electronics as well as some newer wireless network environments. DTC are showing promise in simplifying wireless transmission and reception architectures. However, target bandwidths and carrier frequencies of these future communication protocols are stretching beyond the limits of current DTC technologies.

DESCRIPTION OF THE EMBODIMENTS

The present inventors have recognized that bandwidth and frequency requirements of future wireless communication protocols are pushing beyond what present technology can reliably provide. Recent developments using DTC in polar transmitters show promise in simplifying the transmission and reception electronic architecture. The inventors have further recognized a parallel DTC architecture that can address the high bandwidth and high frequency limitations of current phased locked loop PLL architectures.

In general, a DTC based architecture can simplify transmission and reception architectures by allowing a single PLL or reference frequency to be shared between communication functions such as being shared between two or more transmitters, two or more receivers or a combination of transmitters and receivers. In certain examples, a DTC can be used to shift a PLL frequency or frequency of a frequency generator for use in a receiver processing path. In certain examples, a DTC can be used to shift frequency and optionally provide modulation for transmission processing path. The parallel DTC architecture discussed below can be used in a variety of communication devices as well as non-communication application. With regards to communication devices, the parallel DTC architecture can be used to generate a frequency different from a reference frequency of a central oscillator or central frequency generator by using a frequency ramp to offset or shift the reference frequency. Such frequency shifting can be implemented in a variety of communication circuits including receivers, transmitters, such as polar transmitters and Cartesian transmitters, and transceivers. In some examples, the parallel DTC architecture can be used to provide phase modulation. In some examples, the parallel DTC architecture can be used to provide frequency shifting and phase modulation.

Figure 1A:
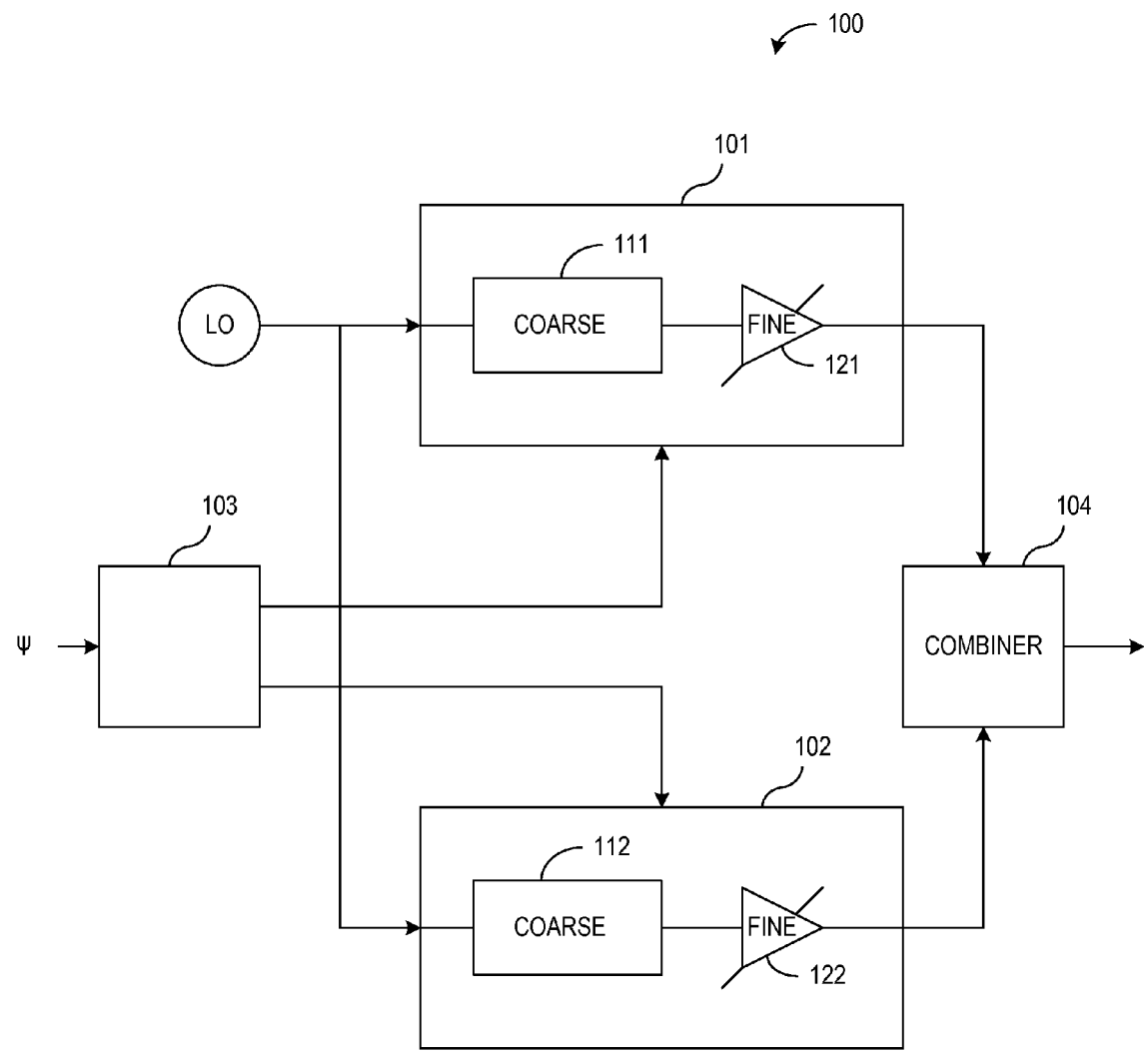
FIGS. 1A-1C illustrate generally example parallel DTC architectures.

FIG. 1A illustrates generally an example parallel DTC architecture 100 for a transmitter. In certain examples, the transmission architecture can include a first DTC 101, a second DTC 102, a logic circuit 103 for receiving modulation information ($\psi$) and providing the modulation information to each DTC 101, 102 and a combiner 104. The two DTCs 101, 102 can work together to share a reference frequency signal, such as a reference frequency signal from a PLL, local oscillator (LO) or a digitally controlled oscillator (DCO), and provide a modulated output signal ($DTC_1$, $DTC_2$). In certain examples, using two DTCs 101, 102 can allow independent rising and falling edge modulation of the output signal ($DTC_{OUT}$) using lower frequency components. In some examples, an output frequency of the transmitter can be the same as a frequency of the output signal ($DTC_1$, $DTC_2$) of the DTCs 101, 102. In some examples, the output frequency of the transmitter can be double a frequency of the output signal ($DTC_1$, $DTC_2$) of the DTCs 101, 102. In certain examples, the first DTC 101 and the second DTC 102 can receive a reference signal from a frequency generator (LO), and can receive modulation information from an optional rate converter, such as a fractional sample rate converter (FSRC), based on modulation information ($\psi$) received from a processor, such as a baseband processor. In some examples, the DTCs 101, 102 can independently modulate rising and falling edges of an output signal of the transmitter to support very high frequency and wide channel bandwidths. In certain examples, each DTC can include a coarse phase adjustment 111, 121 and a fine phase adjustment 112, 122 for shifting each edge of the reference signal to generate an output signal ($DTC_1$, $DTC_2$) of the respective DTC 101, 102. In certain examples, the combiner can receive the output signal ($DTC_1$, $DTC_2$) of the individual DTCs 101, 102, can process the DTC output signals ($DTC_1$, $DTC_2$) and to provide a signal ($DTC_{OUT}$) representative of a combination of the DTC output signals ($DTC_1$, $DTC_2$). In some examples, the combiner 104 can include a latch circuit 105 (FIG. 1B), such as an Set-Reset latch (SR-latch) circuit, to provide a first method of processing and combining the output signals ($DTC_1$, $DTC_2$) of the individual DTCs 101, 102. In some examples, the combiner 104 can include a doubler circuit 106 (FIG. 1C) to provide a second method of processing and combining the output signals ($DTC_1$, $DTC_2$) of the individual DTCs 101, 102.

Figure 1B:
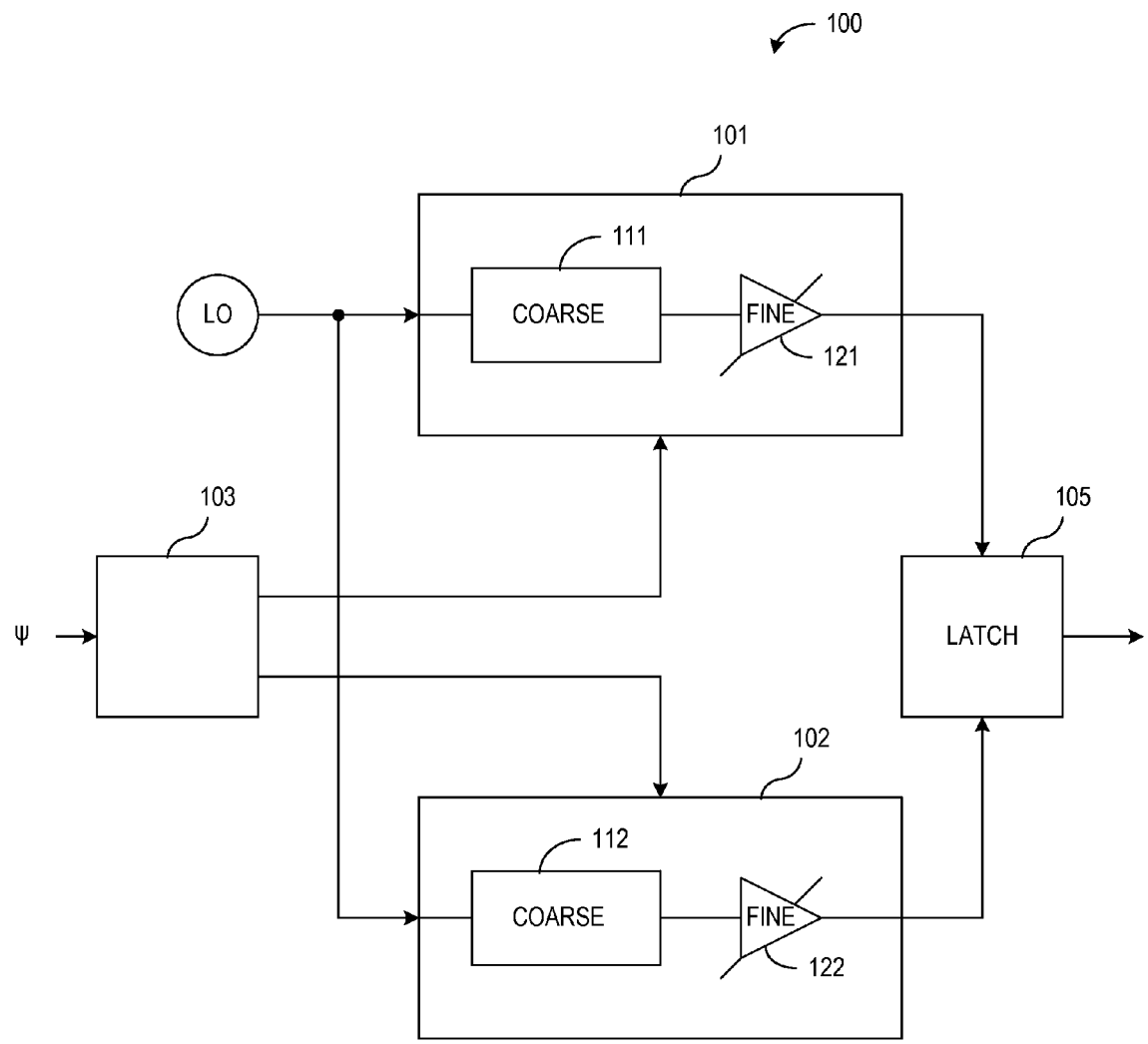
Figure 1C:
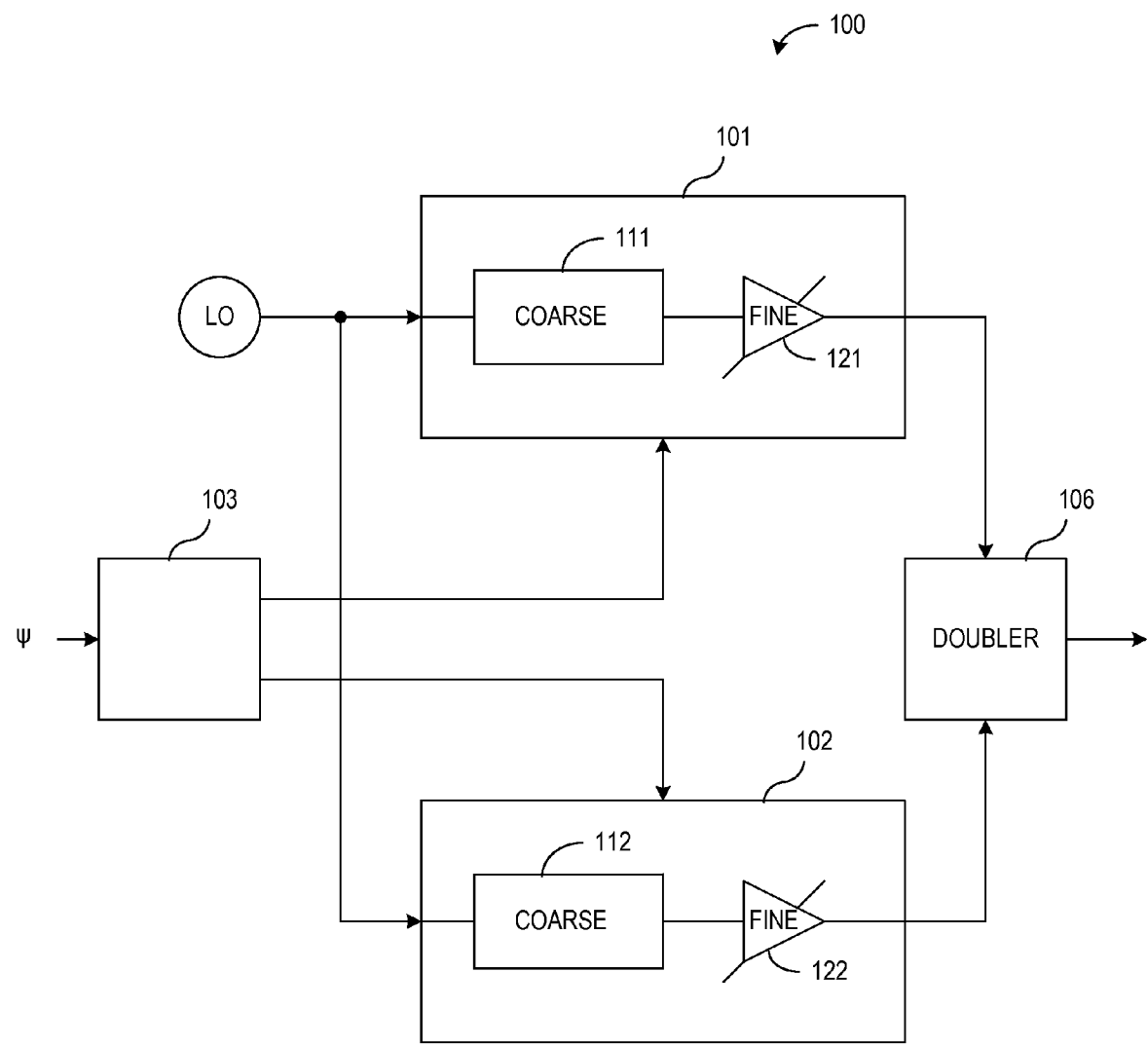

FIGS. 1A-1C illustrate examples of DTC-based transmitters with parallel DTC architectures. It is understood that DTC-based receivers can also employ parallel DTC architectures as shown in FIGS. 1A-1C. In certain examples, a logic circuit 103 for a DTC-based transmitter can include a sample rate converter, such as a fractional sample rate converter, to convert the phase modulation information received from a processor to a proper format for each DTC 101, 102. A logic circuit 103 for a DTC-based receiver can be optional and can include, in certain examples, logic to provide the phase information received from the processor to each DTC 101, 102. In certain examples, the modulation information ($\psi$) can include, but is not limited to, phase modulation information, phase ramp information, or combinations thereof.

Figure 2:
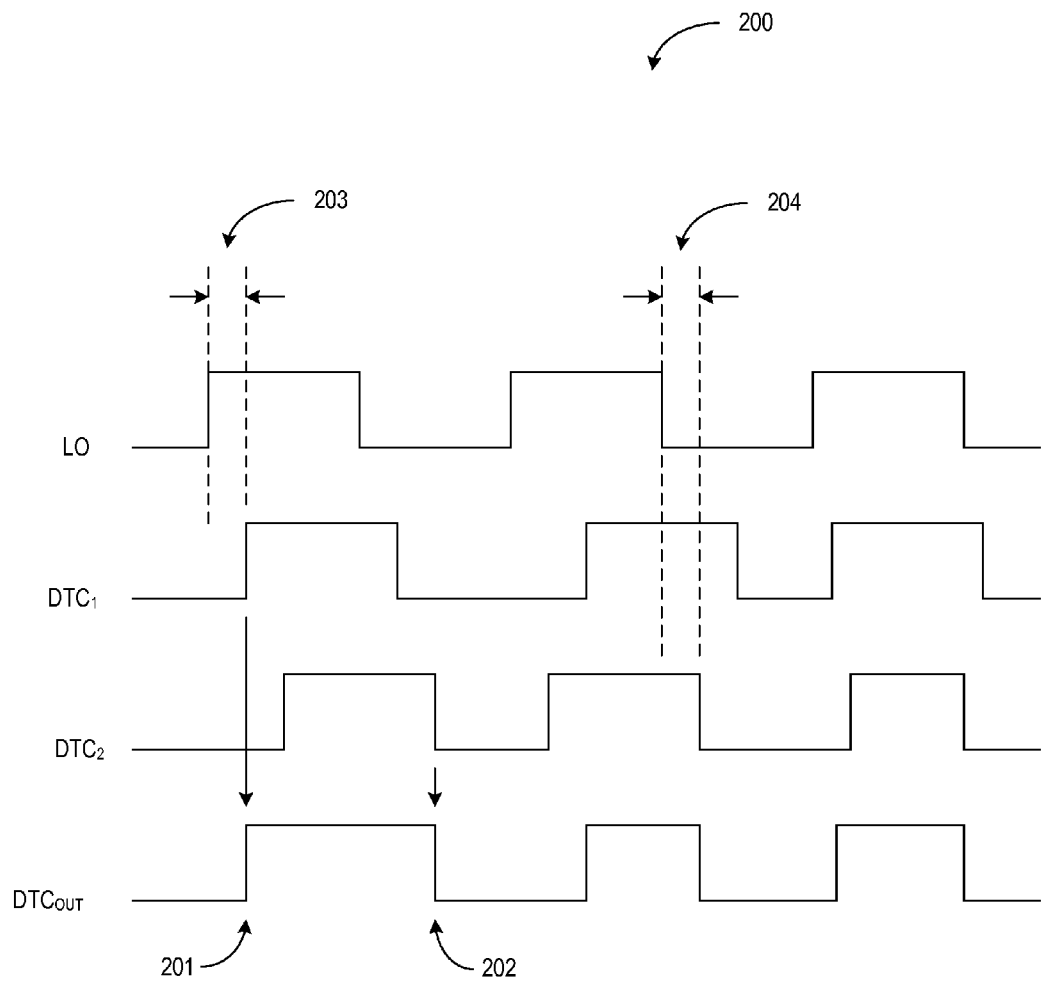
FIG. 2 illustrates graphically an example method of using an example parallel DTC architecture to modulate a transmitter signal.

FIG. 2 illustrates graphically an example method 200 of using an example parallel DTC architecture to modulate a transmitter signal. The graphical plot shows a reference signal (LO) received by each of the parallel DTCs, the output ($DTC_1$) of the first DTC, the output ($DTC_2$) of the second DTC and the output of the combiner ($DTC_{OUT}$). In the illustrated method 200, the combiner can use the output ($DTC_1$) of the first DTC to generate the rising edge 201 of the output signal (DTC$_{OUT}$) of the combiner, and can use the output (DTC$_2$) of the second DTC to generate the falling edge 202 of the output signal (DTC$_{OUT}$) of the combiner. As can be seen, the first DTC can use an edge of the reference signal (LO) to provide rising edge modulation 203 of the output signal (DTC$_{OUT}$) of the combiner and the second DTC can use an edge of the reference signal (LO) provide falling edge modulation 204 of a falling edge of the output signal (DTC$_{OUT}$) of the combiner. In certain examples, the combiner can include an SR-latch circuit to combine the output signals (DTC$_1$, DTC$_2$) of the first DTC and the second DTC.

Figure 3:
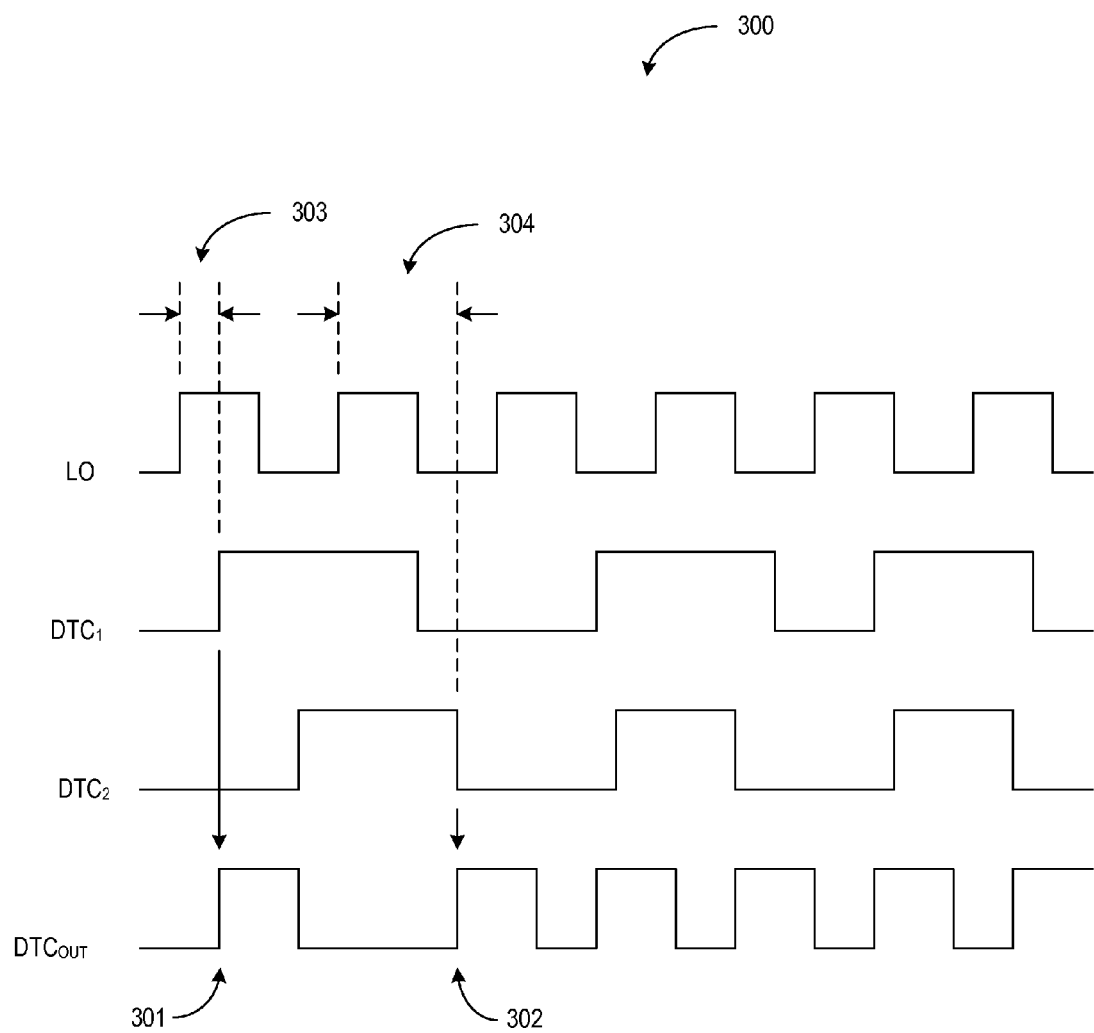
FIG. 3 illustrates graphically an example method of using an example parallel DTC architecture to generate and modulate a transmitter signal.

FIG. 3 illustrates graphically an example method 300 of using an example parallel DTC architecture to generate and modulate a transmitter signal. The graphical plot shows a reference signal (LO) received by each of the DTCs, the output of the first DTC (DTC$_1$), the output of the second DTC (DTC$_2$), and the output of the combiner (DTC$_{OUT}$). In the illustrated method, the combiner can use the output (DTC$_1$) of the first DTC to generate a first pulse 301 of the output signal (DTC$_{OUT}$) of the combiner, and can use the output (DTC$_2$) of the second DTC to generate a second pulse 302 of the output signal (DTC$_{OUT}$) of the combiner. As can be seen, the first DTC can use an edge of the reference signal (LO) to individually modulate 303 the first pulse 301 of the output signal (DTC$_{OUT}$) of the combiner and the second DTC can use an edge of the reference signal (LO) to individually modulate 304 a second pulse 302 of the output signal (DTC$_{OUT}$) of the combiner. In certain examples, the combiner can include a doubler circuit to combine the output signals (DTC$_1$, DTC$_2$) of the first DTC and the second DTC. As can be seen from FIG. 3, the output signal (DTC$_{OUT}$) of the doubler circuit can have a frequency twice as high as an output frequency of the DTCs. In certain examples, the doubler can include a first pulser responsive to the output signal (DTC$_1$) of the first DTC and a second pulser responsive to the output signal (DTC$_2$) of the second DTC. In certain examples, the outputs of the first and second pulsers can be OR'd to form the output signal (DTC$_{OUT}$) of the doubler circuit. In some examples, the first pulser can be responsive to a rising edge of the output signal (DTC$_1$) of the first DTC and the second pulser can be responsive to a falling edge of the output signal (DTC$_2$) of the second DTC. In some examples, the first pulser can be responsive to a falling edge of the output signal (DTC$_1$) of the first DTC and the second pulser can be responsive to a rising edge of the output signal (DTC$_2$) of the second DTC.

Figure 4:
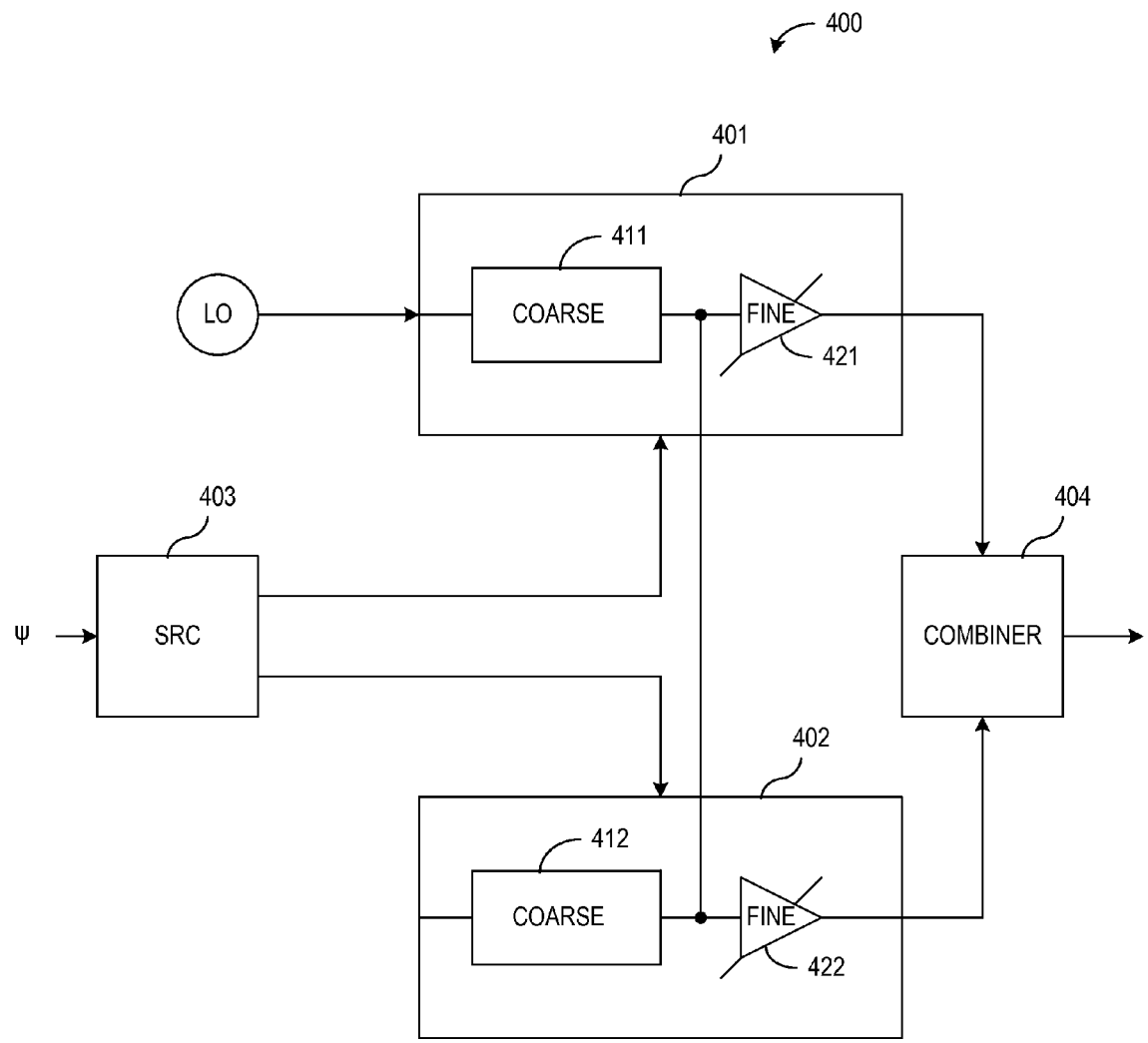
FIG. 4 illustrates generally an example parallel DTC architecture.

FIG. 4 illustrates generally an example parallel DTC architecture 400 for a transmitter. In certain examples, the architecture can include a local oscillator (LO), a sample rate converter 403 including, but not limited to, a fractional sample rate converter, a first DTC 401, a second DTC 402, and a combiner 404. The local oscillator (LO) can provide a reference frequency for reception by the first DTC 401. The sample rate converter 403 can receive phase modulation information, for example, from a baseband processor (not shown) and can provide properly sample phase information to the first and second DTCs 401, 402. For systems that can predictably provide phase correction using the fine stage of a DTC, coarse phase modulation can be provided by a coarse stage 411 of the first DTC 401 and fine phase modulation can be provided by the fine stage 421 of the first DTC 401 and the fine stage 422 of the second DTC 402. In certain examples, the architecture 400 can save power since the coarse stage 412 of the second DTC 402 does not need to be enabled. In certain examples, circuit area can be saved by omitting the coarse stage 412 of the second DTC 402. In some examples, the combiner 404 can include a latch to combine the outputs of each fine stage 412, 422. In some examples, the combiner 404 can include a doubler to combine the outputs of the fine stages 412, 422 and provide a modulated phase signal for a polar transmitter, for example. It is understood that a DTC-based receiver can also incorporate the parallel architecture shown in the example of FIG. 4 without departing from the scope of the present subject matter. In certain examples, a DTC-based receiver can operate without the sample rate converter 403 and may include a logic circuit to receive the phase modulation information and provide the phase modulation information to each of the DTCs 401, 402.

Figure 5:
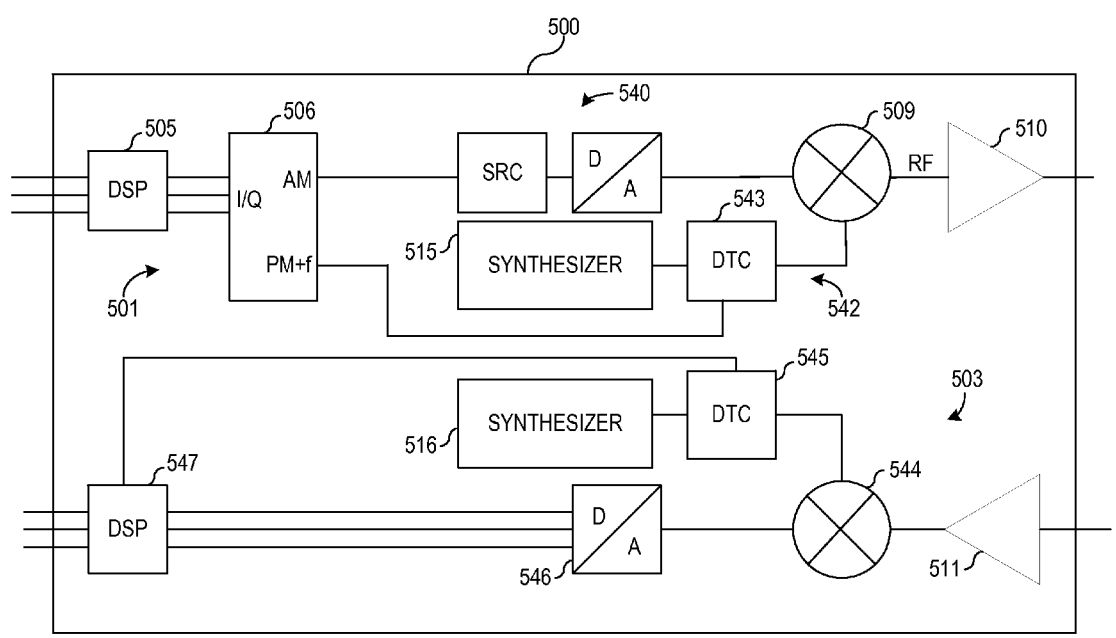
FIG. 5 illustrates generally an example DTC-based transceiver.

FIG. 5 illustrates generally an example DTC-based transceiver 500 for exchanging information between a processor of a wireless device and a processor of one or more other devices using a wireless network or communication link. The transceiver 500 can include a transmitter 501 and a receiver 503. The transmitter 501 can include a processor 505, such as a digital signal processor (DSP), a polar transmitter 540 and a power amplifier 510. The processor 505 can receive transmit data from a host processor (not shown), such as a baseband processor of a cell phone, for example, and can provide transmit information to the polar transmitter 540. The polar transmitter 540 can process the transmit information to provide a modulated radio frequency (RF) signal to the power amplifier 510. The power amplifier 510 can amplify and process the RF signal for transmission using an antenna (not shown). The polar transmitter 540 can include an amplitude processing path 541 for processing digital amplitude symbols of the transmit data and a phase processing path 542 for processing digital phase symbols of the transmit information. The phase processing path 542 can include a transmitter frequency synthesizer 515, to provide central frequency information, and a transmitter DTC 543 to modulate the frequency of the RF signal using the central frequency information. In certain examples, a mixer 509 can add the amplitude information to the envelope of the RF signal to provide the modulated RF signal. In certain examples, the polar transmitter 540 can include a cordic converter 506 to convert the transmit information of the DSP from Cartesian symbols (I, Q) to polar symbols (AM, PM+f). In certain examples, the transmitter DTC can include multiple DTCs operating in parallel with a combiner to provide reliable high-frequency, high-bandwidth communications.

The receiver 503 can include an amplifier 511, demodulator 544, a receiver frequency synthesizer 516, a receiver DTC 545, an analog-to-digital converter (ADC) 546 and a processor 547, such as a receiver DSP. In certain examples, an antenna coupled to the receiver 503 can receive a wireless signal. The amplifier 511 can amplify the wireless signal; or certain portions of the wireless signal. The demodulator 544 can extract information from the wireless signal using a frequency provided by the receiver DTC 545. The ADC 546 can convert the information from an analog form to digital information for further processing by the processor 547. The processor 547 can provide at least a portion of the information to a host processor such as the baseband processor. In certain examples, the receiver DTC can include multiple DTCs operating in parallel with a combiner to provide reliable high-frequency, high-bandwidth communications.

As discussed above, it is understood that parallel DTC architecture can be employed with other communication devices in addition to a polar transmitter as shown in FIG. 5 without departing from the scope of the present subject matter. Such other communication devices can include, but are not limited to, receivers, other transmitters such as Cartesian transmitters, and transceivers.

Additional Notes

In Example 1, an apparatus can include a first digital-to-time converter (DTC) configured to receive reference frequency information and first phase information and to provide a first portion of phase modulation information, a second DTC configured to receive second phase information and to provide a second portion of phase modulation information, and a combiner configured to receive the first portion and the second portion and to provide a phase modulated signal.

In Example 2, the combiner of Example 1 optionally includes a Set-Reset (SR) latch.

In Example 3, the SR latch of any one or more of Examples 1-2 optionally is configured to position a first edge of a pulse of the phase modulation signal using the first portion and to position a second edge of the pulse using the second portion.

In Example 4, the second DTC of any one or more of Examples 1-3 optionally is configured to receive the oscillator information, and to provide the second portion using the oscillator signal.

In Example 5, the combiner of any one or more of Examples 1-4 optionally includes a first pulse module configured to provide a plurality of first pulses based on the first portion.

In Example 6, the combiner of any one or more of Examples 1-5 optionally includes a second pulse module configured to provide a plurality of second pulses based on the second portion.

In Example 7, the combiner of any one or more of Examples 1-6 optionally includes an OR-gate configured to combine the plurality of first pulses with the plurality of second pulses to provide the phase modulation signal.

In Example 8, a frequency of the first and second DTCs of any one or more of Examples 1-7 optionally is approximately half of a frequency of the phase modulation signal.

In Example 9, the first DTC of any one or more of Examples 1-8 optionally includes a coarse stage configured to coarsely adjust a first edge and a second edge of the phase modulation signal and a first fine stage configured to finely adjust the first edge using the first phase information to provide the first portion, and the second DTC of any one or more of Examples 1-8 optionally includes a second fine stage configured to receive an output of the coarse stage and to finely adjust the second edge using the second phase information to provide the second portion.

In Example 10, the second DTC of any one or more of Examples 1-9 optionally does not include a coarse stage.

In Example 11, a method of providing a phase modulation signal can include receiving oscillator information and first phase information at a first digital-to-time converter (DTC), providing a first portion of phase modulation information using the first DTC, the oscillator information and the first phase information, receiving second phase information at a second DTC, providing a second portion of phase modulation information using the second DTC and the second phase information, receiving the first portion and the second portion of phase modulation information at a combiner, and combining the first portion and the second portion using the combiner to provide the phase modulation signal.

In Example 12, the combining of any one or more of Examples 1-11 optionally includes generating a first edge of a pulse of the phase modulation signal using the first portion, and generating a second edge of the pulse using the second portion.

In Example 13, the generating the first edge of the pulse and the generating the second edge of the pulse of any one or more of Examples 1-12 optionally includes using a set-reset (S-R) latch of the combiner.

In Example 14, the phase modulation signal of any one or more of Examples 1-13 optionally includes a first plurality of pulses and a second plurality of pulses, and the combining of any one or more of Examples 1-13 optionally includes interleaving the first plurality of pulses with the second plurality of pulses using an OR-gate of the combiner.

In Example 15, the combining of any one or more of Examples 1-14 optionally includes receiving the first portion of the phase modulation information at a first pulse module of the combiner, generating the first plurality of pulses using the first pulse module and the first portion of phase modulation information, receiving the second portion of the phase modulation information at a second pulse module of the combiner, and generating the first plurality of pulses using the second pulse module and the second portion of phase modulation information.

In Example 16, a frequency of the phase modulation signal of any one or more of Examples 1-15 optionally is twice the operating frequency of the first and second DTCs.

In Example 17, the method of any one or more of Examples 1-16 optionally includes receiving the oscillator information at the second DTC, and the providing a second portion of the phase modulation information of any one or more of Examples 1-16 optionally includes using the oscillator information.

In Example 18, a system comprising an antenna, a wireless communication module coupled to the antenna. The wireless communication module can include a frequency synthesizer to provide reference frequency information, a first digital-to-time converter (DTC) configured to receive the reference frequency information and first phase information and to provide a first portion of phase modulation information, a second DTC configured to receive second phase information and to provide a second portion of the phase modulation information, and a combiner configured to receive the first portion and the second portion and to provide a phase modulated signal.

In Example 19, the wireless communication module of any one or more of Examples 1-18 optionally includes a wireless transmitter.

In Example 20, the wireless communication module of any one or more of Examples 1-19 optionally includes a wireless receiver.

In Example 21, the wireless communication module of any one or more of Examples 1-20 optionally includes a wireless transceiver.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus comprising:
   a first digital-to-time converter (DTC) configured to receive reference frequency information and first phase information and to provide a first portion of phase modulation information;
   a second DTC configured to receive second phase information and to provide a second portion of phase modulation information; and
   a combiner configured to receive the first portion and the second portion and to provide a phase modulated signal.

2. The apparatus of claim 1, wherein the combiner includes a Set-Reset (SR) latch.

3. The apparatus of claim 2, wherein the SR latch is configured to position a first edge of a pulse of the phase modulation signal using the first portion and to position a second edge of the pulse using the second portion.

4. The apparatus of claim 3, wherein the second DTC is configured to receive the oscillator information and to provide the second portion using the oscillator signal.

5. The apparatus of claim 1, wherein the combiner includes a first pulse module configured to provide a plurality of first pulses based on the first portion.

6. The apparatus of claim 5, wherein the combiner includes a second pulse module configured to provide a plurality of second pulses based on the second portion.

7. The apparatus of claim 6, wherein the combiner includes an OR-gate configured to combine the plurality of first pulses with the plurality of second pulses to provide the phase modulation signal.

8. The apparatus of claim 7, wherein a frequency of the first and second DTCs is approximately half of a frequency of the phase modulation signal.

9. The apparatus of claim 1, wherein the first DTC includes:
   a coarse stage configured to coarsely adjust a first edge and a second edge of the phase modulation signal; and
   a first fine stage configured to finely adjust the first edge using the first phase information to provide the first portion; and
   wherein the second DTC includes a second fine stage configured to receive an output of the coarse stage and to finely adjust the second edge using the second phase information to provide the second portion.

10. The apparatus of claim 9, wherein the second DTC does not include a coarse stage.

11. A method of providing a phase modulation signal, the method comprising:
   receiving oscillator information and first phase information at a first digital-to-time converter (DTC);
   providing a first portion of phase modulation information using the first DTC, the oscillator information and the first phase information;
   receiving second phase information at a second DTC;
   providing a second portion of phase modulation information using the second DTC and the second phase information;
   receiving the first portion and the second portion of phase modulation information at a combiner; and
   combining the first portion and the second portion using the combiner to provide the phase modulation signal.

12. The method of claim 11, wherein the combining includes
   generating a first edge of a pulse of the phase modulation signal using the first portion; and
   generating a second edge of the pulse using the second portion.

13. The method of claim 12, wherein the generating the first edge of the pulse and the generating the second edge of the pulse includes using a set-reset (S-R) latch of the combiner.

14. The method of claim 11, wherein the phase modulation signal includes a first plurality of pulses and a second plurality of pulses; and
   wherein the combining includes interleaving the first plurality of pulses with the second plurality of pulses using an OR-gate of the combiner.

15. The method of claim 14, wherein the combining includes:
   receiving the first portion of the phase modulation information at a first pulse module of the combiner;
   generating the first plurality of pulses using the first pulse module and the first portion of phase modulation information;
   receiving the second portion of the phase modulation information at a second pulse module of the combiner; and
   generating the first plurality of pulses using the second pulse module and the second portion of phase modulation information.

16. The method of claim 15, wherein a frequency of the phase modulation signal is twice the operating frequency of the first and second DTCs.

17. The method of claim 11, includes receiving the oscillator information at the second DTC; and
   wherein the providing a second portion of the phase modulation information includes using the oscillator information.

18. A system comprising:
   an antenna;
   a wireless communication module coupled to the antenna; and
   wherein the wireless communication module includes:
      a frequency synthesizer to provide reference frequency information;

a first digital-to-time converter (DTC) configured to receive the reference frequency information and first phase information and to provide a first portion of phase modulation information;
a second DTC configured to receive second phase information and to provide a second portion of the phase modulation information; and
a combiner configured to receive the first portion and the second portion and to provide a phase modulated signal.

19. The system of claim 18, wherein the wireless communication module includes a wireless transmitter.

20. The system of claim 18, wherein the wireless communication module includes a wireless receiver.

21. The system of claim 18, wherein the wireless communication module includes a wireless transceiver.

* * * * *

UNITED STATES PATENT AND TRADEMARK OFFICE
CERTIFICATE OF CORRECTION

PATENT NO. : 9,054,925 B1  
APPLICATION NO. : 14/096464  
DATED : June 9, 2015  
INVENTOR(S) : Madoglio et al.

Page 1 of 1

It is certified that error appears in the above-identified patent and that said Letters Patent is hereby corrected as shown below:

Title page, item (22), in "Filed", in column 1, line 1, after "2013", insert
--¶(65) Prior Publication Data
US 2015/0156044 A1 Jun. 04, 2015--, therefor Signed and Sealed this
Twenty-eighth Day of June, 2016

Michelle K. Lee
*Director of the United States Patent and Trademark Office*